(12) United States Patent
Olson et al.

(10) Patent No.: US 7,177,447 B2
(45) Date of Patent: Feb. 13, 2007

(54) REAL-TIME MULTI-STAGE INFRARED IMAGE-BASED TRACKING SYSTEM

(75) Inventors: Teresa Lorae Pace Olson, Orlando, FL (US); James Joseph Slaski, Orlando, FL (US); Carl William Sanford, Orlando, FL (US); Ruey-Yuan Han, Winter Park, FL (US); Casey Leonard Contini, Clermont, FL (US); Robert Russell Reinig, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 255 days.

(21) Appl. No.: 10/444,142

(22) Filed: May 23, 2003

(65) Prior Publication Data

US 2006/0291693 A1    Dec. 28, 2006

Related U.S. Application Data

(63) Continuation-in-part of application No. 09/255,781, filed on Feb. 23, 1999, now abandoned.

(51) Int. Cl.
 *G06K 9/00* (2006.01)
(52) U.S. Cl. ...................... 382/103; 348/169
(58) Field of Classification Search ............... 382/100, 382/103, 107, 199; 358/907; 348/25, 137, 348/140, 170–172, 208.14, 211.7, 287, 329, 348/579, 331
See application file for complete search history.

(56) References Cited

U.S. PATENT DOCUMENTS

| | | | |
|---|---|---|---|
| 4,470,048 A | | 9/1984 | Short, III |
| 4,550,435 A | | 10/1985 | Hayman |
| 4,739,401 A | * | 4/1988 | Sacks et al. ................ 382/103 |
| 4,849,906 A | | 7/1989 | Chodos |
| H713 H | * | 11/1989 | May et al. .................. 382/103 |
| 5,187,777 A | | 2/1993 | Conboy et al. |

(Continued)

OTHER PUBLICATIONS

*Spatiotemporal Multiscan Adaptive Matched Filtering*, Kenneth A. Melendez and James W. Modestino, Paper No. 2561-06, SPIE Proceedings vol. 2561, Signal and Data Processing of Small Targets, pp. 51-65, 1995, ISBN 0 8194 1920 6.

(Continued)

*Primary Examiner*—Jingge Wu
*Assistant Examiner*—Abolfazl Tabatabai
(74) *Attorney, Agent, or Firm*—Buchanan Ingersoll and Rooney PC

(57) ABSTRACT

A multi-stage infrared (IR) image-based tracking system is provided that accurately identifies and tracks targets across a variety of different situations and environmental conditions. The system includes primary and secondary trackers. The secondary tracker supports the primary tracker by identifying and tracking targets when the primary tracker loses or fails to identify one or more targets, and helps the primary tracker reacquire valid targets. In an exemplary embodiment of the invention, the primary tracker is a correlation-based tracker, and the secondary tracker is a feature-based tracker. A prescreener is also included, which operates concurrently with the correlation-based and feature-based trackers to generate a list of possible targets. The list can be used to provide a confidence level for the probable targets identified by each of the primary and secondary trackers.

38 Claims, 11 Drawing Sheets

U.S. PATENT DOCUMENTS

| | | | |
|---|---|---|---|
| 5,214,433 A | | 5/1993 | Alouani et al. |
| 5,235,651 A | * | 8/1993 | Nafarieh .................... 382/290 |
| 5,323,472 A | | 6/1994 | Falk |
| 5,325,098 A | | 6/1994 | Blair et al. |
| 5,335,298 A | | 8/1994 | Hevenor et al. |
| 5,341,142 A | | 8/1994 | Ries et al. |
| 5,422,828 A | | 6/1995 | Choate et al. |
| 5,479,525 A | * | 12/1995 | Nakamura et al. .......... 382/297 |
| 5,647,015 A | | 7/1997 | Choate et al. |
| 5,651,512 A | * | 7/1997 | Sand et al. ................ 244/3.11 |
| 5,809,171 A | | 9/1998 | Neff et al. |
| 5,870,486 A | | 2/1999 | Choate et al. |
| 5,947,413 A | | 9/1999 | Mahalanobis |
| 5,963,653 A | | 10/1999 | McNary et al. |
| 5,982,930 A | | 11/1999 | Neff et al. |
| 5,990,939 A | | 11/1999 | Sand et al. |
| 6,005,609 A | | 12/1999 | Cheong |
| 6,031,568 A | | 2/2000 | Wakitania |
| 6,042,050 A | | 3/2000 | Sims et al. |
| 6,055,334 A | | 4/2000 | Kato |
| 6,079,862 A | * | 6/2000 | Kawashima et al. ........ 382/103 |

OTHER PUBLICATIONS

*Maneuvering Target Tracking by Using Image Processing Photosensor,* Sergey L. Vinogradov, Paper No. 2561-20, SPIE Proceedings vol. 2561, Signal and Data Processing of Small Targets, pp. 210-219, 1995, ISBN 0 8194 1920 6.

*Long-Range Automatic Detection of Small Targets in Sequence of Noisy Thermal Infrared Images,* Dirk Borghys and Marc B. Acheroy, Paper No. 2235-60, SPIE Proceedings vol. 2235, Signal and Data Processing of Small Targets, pp. 264-275, 1994, ISBN 0 8194 1539 1.

*Feature-Based Tracking and Recognition for Remote Sensing,* Curtis Padgett and David Q. Zhu, Paper No. 2466-05, SPIE Proceedings vol. 2466, Space Guidance, Control, and Tracking II, pp. 41-50, 1995, ISBN 0 8194 1819 6.

\* cited by examiner

REAL-TIME MULTI-STAGE INFRARED IMAGE-BASED TRACKING SYSTEM

The present application is a continuation-in-part of U.S. application Ser. No. 09/255,781 filed Feb. 23, 1999, now abandoned the entire contents of which are herein expressly incorporated by reference.

FIELD OF THE INVENTION

The present invention relates to the field of infrared (IR) image tracking.

BACKGROUND OF THE INVENTION

Conventional IR image-based tracking systems, for example those used in missile-based tracking systems for guiding missiles, typically use only one kind of tracking mechanism, such as a correlation-based tracker, to recognize a target's IR signature within an IR image. A target's IR signature can vary, for example, depending on the time of day, the character of objects and terrain near the target, atmospheric conditions, aspect and depression angles, and a distance of the target from the IR image capture mechanism that provides IR image frames to the tracking system. The IR target signature can vary depending on a distance from the target because the size of the target within an IR image frame and therefore the number of pixels in the IR image frame on the target will vary depending on the distance. When environmental conditions or other situations sufficiently alter a target's IR signature, the tracking mechanism can cease to recognize the target in a realtime IR image frame provided to the tracking mechanism, thereby "losing" the target. When a tracking mechanism loses a target in a number of consecutive image frames the tracking mechanism may lose the track of the target.

For example, when a target such as a battle tank moves behind another object so that an outline of the tank is partially hidden behind the object, the remaining outline in the IR image provided to the correlation-based tracker may not provide enough clues for the correlation-based tracker to identify or see the tank in the image. If the correlation tracker does not identify the tank in a number of consecutive image frames, the correlation-based tracker can lose its track of the tank. When the tracker loses its track of the tank, a device being guided by the correlation-based tracker can be guided towards an object which is not the tank, i.e., not the intended target.

Different kinds of tracking mechanisms have different strengths and weaknesses. For example, feature-based trackers are often better than correlation-based trackers at identifying a target whose outline is partially hidden or missing, but are also slower. This can be problematic, for example, in situations where a target rapidly changes position relative to a missile guided by the tracking system.

Accordingly, a need exists for a tracking system that is robust, accurate and effective across a variety of different situations and environmental conditions.

SUMMARY OF THE INVENTION

In accordance with exemplary embodiments of the invention, a multi-stage IR image-based tracking system is provided that accurately identifies and tracks targets across a variety of different situations and environmental conditions. The system includes primary and secondary trackers. The secondary tracker supports the primary tracker by identifying and tracking targets when the primary tracker loses or fails to identify one or more targets, and helps the primary tracker reacquire valid targets. The primary tracker can be, for example, a correlation-based tracker, and the secondary tracker can be, for example, a feature-based tracker. Exemplary embodiments of the invention also include a prescreener that operates concurrently with the correlation-based and feature-based trackers to generate a list of probable targets. In addition, an automatic target recognition (ATR) function can be provided in the tracking system to help reacquire an original target after both the primary and secondary trackers have lost the original target, or to acquire a new target.

In accordance with an exemplary embodiment of the invention, a multi-stage image-based tracking system includes a first tracker for identifying at least one target within at least one image provided to the system and a second tracker for identifying the at least one target within the at least one image, wherein when the first tracker fails to identify the at least one target, the secondary tracker provides identification of the at least one target to the first tracker. The system can also include a prescreener for processing the at least one image to provide a list of possible targets, wherein the first and second trackers identify the at least one target based on the at least one image and the list.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE PREFERRED EMBODIMENTS

Figure 1:
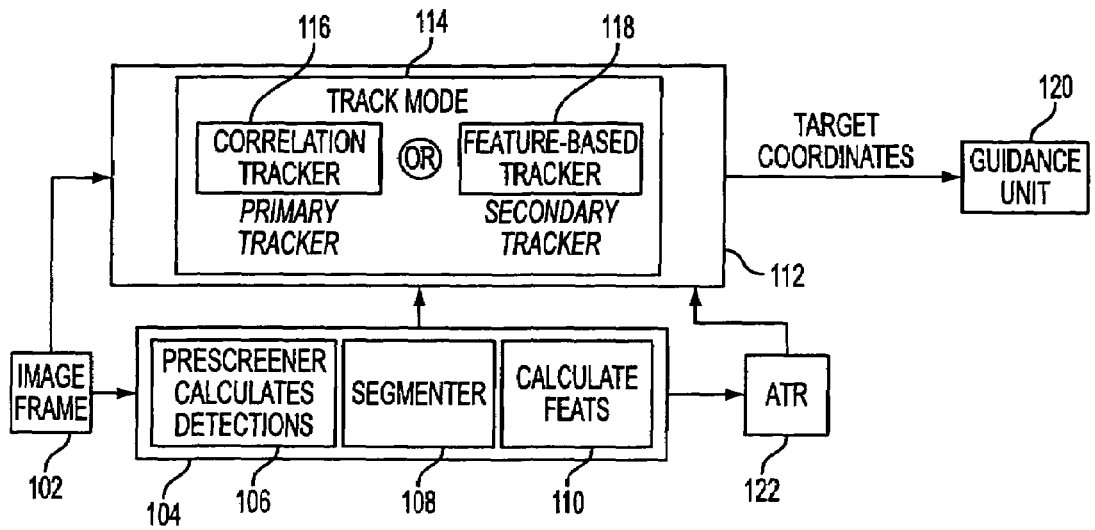
FIG. 1 illustrates a functional block diagram of a tracking system in accordance with an exemplary embodiment of the invention.

FIG. 1 illustrates a functional block diagram of a tracking system in accordance with an exemplary embodiment of the invention which can be used, for example, to guide a missile to a target. An image frame 102 representing an IR image is provided to both a tracking function 112 and a preliminary analysis function 104. The tracking function 112 includes a correlation-based tracker function 116, which is used as the primary tracker, and a feature-based tracker function 118 that is used as the secondary tracker. In alternate embodiments, the primary tracker can be a feature-based tracker, or any other type of tracker, and the secondary tracker can be a correlation-based tracker, or any other type of tracker.

The preliminary analysis function 104 includes a prescreener 106 that evaluates the IR image frame, and provides a listing indicating possible targets to the tracking function 112. Each item in the list indicates a location within the IR image frame provided to the tracking system that corresponds to a point on a probable target within the IR image frame. For example, each item can indicate a location, referred to herein as a "centroid", which represents a point on a two-dimensional image of the target and which is at or near the center of the target in the image. The list generated by the prescreener can be used to improve a confidence level that targets have been accurately identified by each of the correlation-based and the feature-based trackers. The secondary tracker can, in an exemplary embodiment of the invention, operate concurrently with the primary tracker, or can be activated when the primary tracker loses the target or can be activated at periodic or aperiodic intervals.

The tracking function 112 receives the IR image via the image frame 102 and receives centroids of possible targets and other information from the preliminary analysis function 104. Based on this received information the tracking function 112 provides target coordinates to a guidance unit 120 (e.g., a guidance control unit), which guides the missile to the target.

The preliminary analysis function 112 also includes a segmenter 108 for extracting segments representing portions of the image frame 102, and a feature calculator 110 for calculating features of targets or possible targets in the segments. The segmenter 108 and the feature calculator 110 can also be implemented as part of the feature-based tracker 118.

In accordance with an exemplary embodiment of the invention, the correlation-based and feature-based trackers are implemented in software that can be, for example, executed using a variety of microprocessor platforms, and the prescreener is implemented in hardware. As those skilled in the art will appreciate, any or all of the trackers, the prescreener and other functions disclosed herein with respect to exemplary embodiments of the invention can be implemented in software or hardware.

Figure 2:
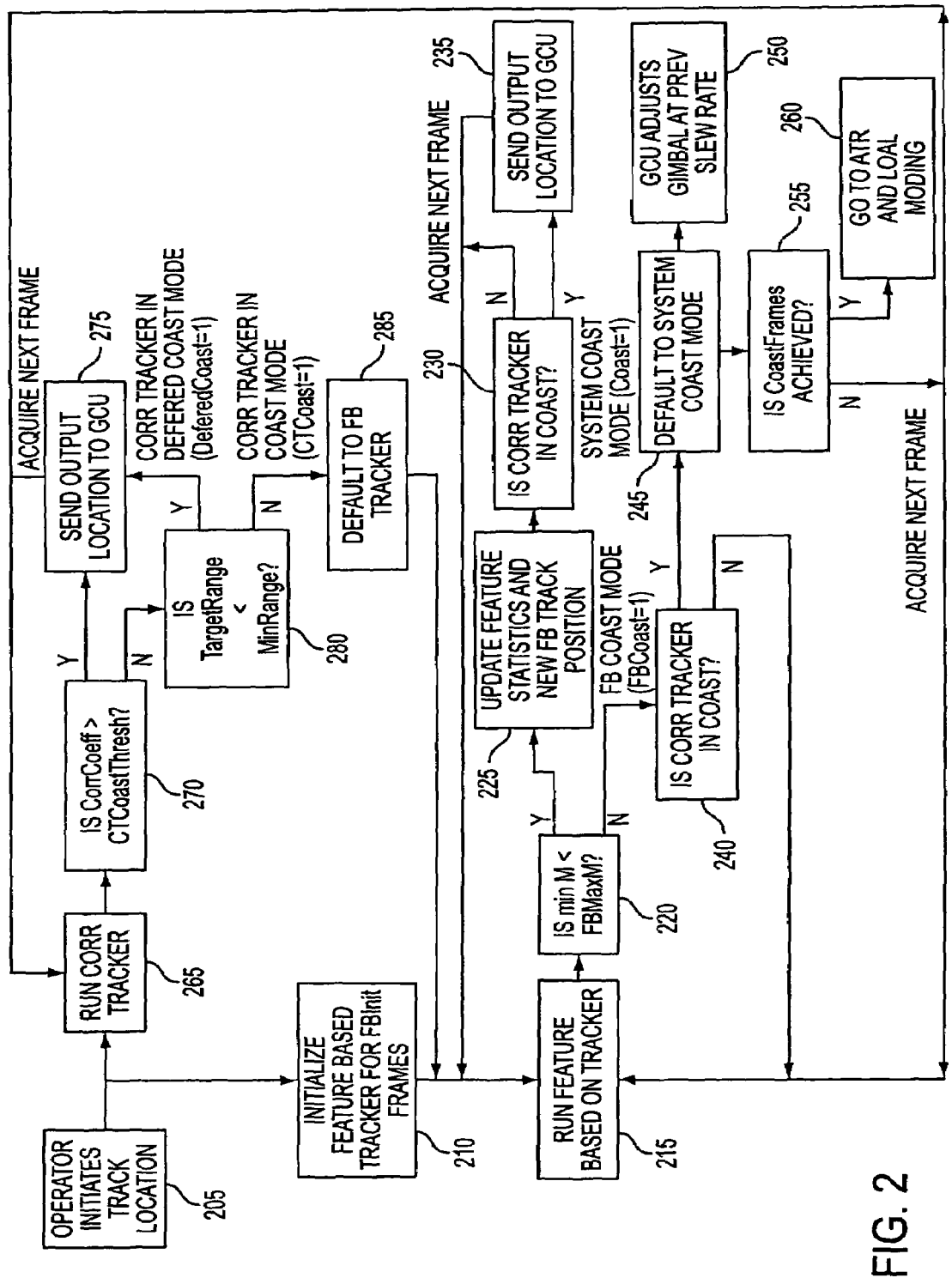
FIG. 2 illustrates an exemplary method of a tracking system in accordance with the present invention.

FIG. 2 illustrates an exemplary method of a tracking system in accordance with the present invention. Initially an operator initiates a track location by designating a target in an image. As illustrated by the split path out of step 205, the correlation tracker and the feature-based tracker run in parallel. After the operator initiates a track location, the feature-based tracker is initialized for a predetermined number (FBInit) image frames (step 210).

Figure 3:
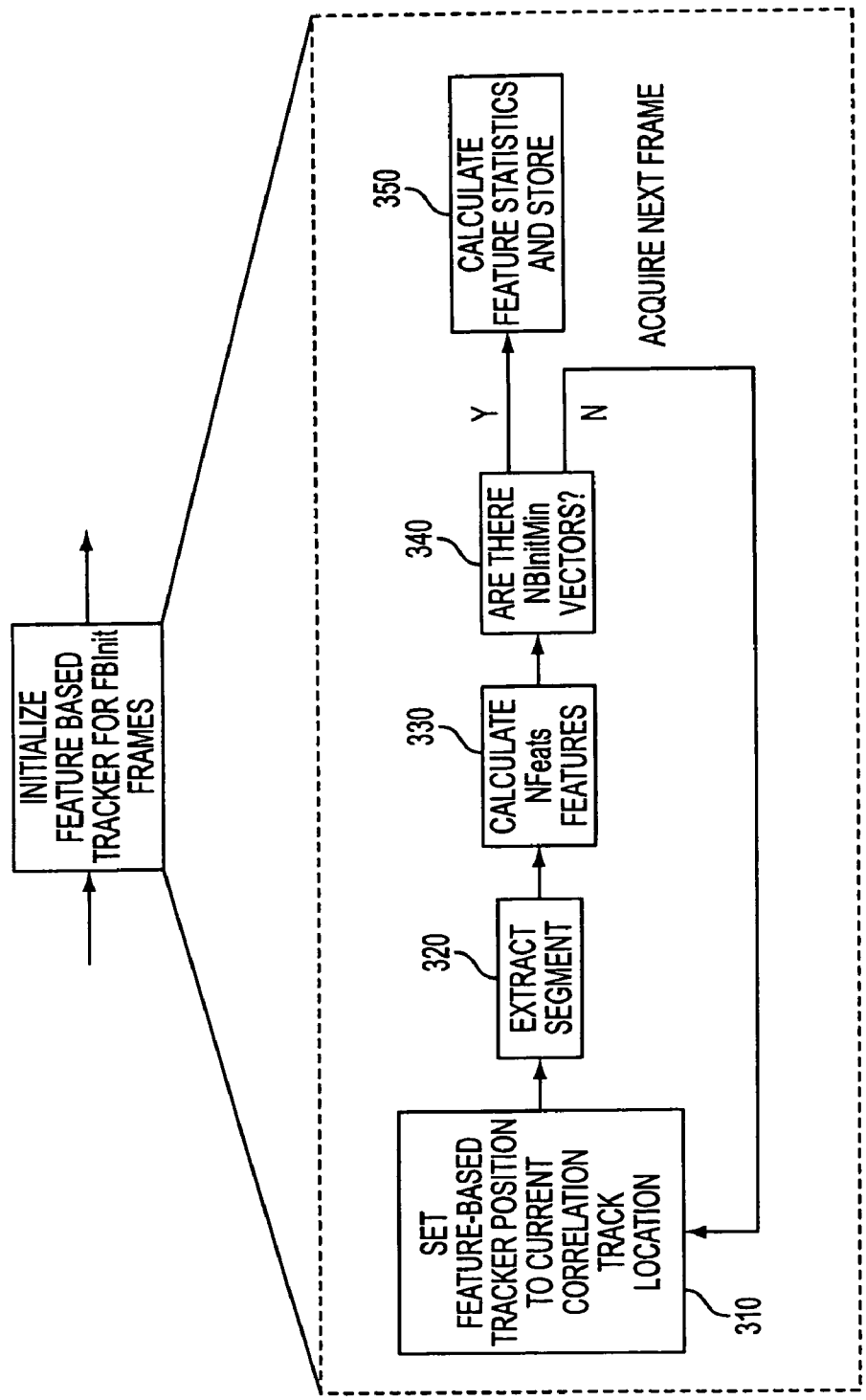
FIG. 3 illustrates the initialization of the feature-based tracker in accordance with exemplary embodiments of the present invention.

FIG. 3 illustrates the initialization of the feature-based tracker. Initialization of the feature-based tracker occurs when the track of the correlation tracker is above a confidence value (discussed in more detail below). Initially, the feature-based tracker position is set to the current correlation tracker location (step 310). Specifically, the prescreener provides target pixel coordinates to the feature-based tracker based on portions of the image which the correlation tracker indicates are targets. Next a segment around the track location is extracted (step 320). The extracted segments are provided to the feature-based tracker by the prescreener. A calculation of a predetermined number of features (NFeats) from the extracted segment is calculated (step 330). If there are less than a predetermined number of vectors (NBInitMin)("NO" path out decision step 340), then the next image frame is acquired and the feature-based tracker is reinitialized (steps 310 through 340). If, however, there are more than a predetermined number of NBInitMin vectors ("YES" path out decision step 340), then feature statistics are calculated and stored (step 350). Specifically, a sum and a squared sum of the extracted features over the number of image frames required to satisfy the predetermined number NBInitMIN of vectors of step 340 are calculated and stored.

Figure 4:
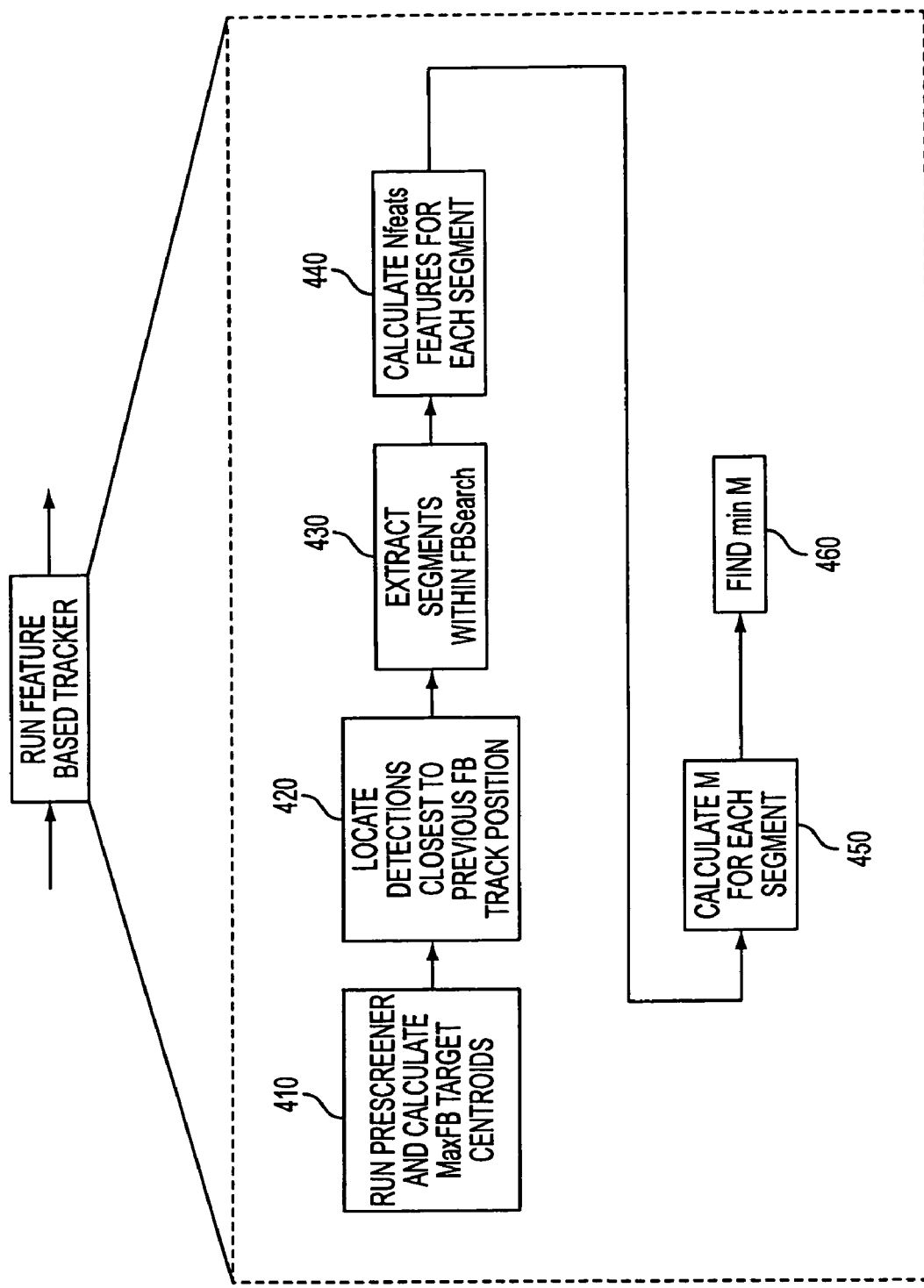
FIG. 4 illustrates the operation of the feature-based tracker after initialization in accordance with exemplary embodiments of the present invention.

Referring again to FIG. 2, after the feature-based tracker has been initialized (step 210), then the feature-based tracker is operational (step 215). FIG. 4 illustrates the operation of the feature-based tracker in accordance with exemplary embodiments of the present invention. While the prescreener runs it provides target centroids to the feature-based tracker which calculates a maximum number (MaxFB) of target centroids (step 410). The feature-based tracker locates detections closest to the previous track position of the feature-based tracker and within a predetermined search window around the previous track position. If the prescreener does not provide a target centroid within the predetermined search window, an artificial centroid is created at the previous track position (step 420). The feature-based tracker extracts segments within a predetermined search window FBSearch (step 430). The feature-based tracker then calculates a predetermined number (Nfeats) of features for each extracted segment (step 440). The features can include, for example, an area of the target, and an average perimeter gradient of the target or any other desired feature. The features can also include a signal-to-noise ratio or ratio of a signal representing a target and a noise representing a background surrounding the target in a target frame encompassing the target. The features can also include a height of the target, and a width of the target. The features can also include a perimeter-square over area ratio, which is a ratio of a length of the target's perimeter or outline to the area within the perimeter. The features can also be appropriately normalized with respect to a range or distance between the missile or IR image pickup and the target. The feature-based tracker calculates a similarity metric M for each segment (step 450) and determines the segment which provides the minimum value for the similarity metric (step 460).

Referring again to FIG. 2, while the feature-based tracker runs (step 215) it is determined whether the minimum similarity metric M is less than a predetermined maximum value (FBMaxM) for a distance between vectors (step 220). A similarity metric such as a Mahalanobis distance metric can be employed using the moving mean and variance of the features over a number of image frames. Specifically, the Mahalanobis distance metric can be used to determine the degree of similarity of a current target segment to past observations of the target being tracked. The Mahalanobis distance metric is described in *Pattern Classification and Scene Analysis*, by R. Duda and P. Hart, John Wiley & Sons Inc., New York, 1973, which is hereby incorporated by reference. In this formulation, it is assumed that the chosen features are essentially uncorrelated and thus a diagonal matrix containing the inverse variance of each of the features replaces the inverse covariance matrix. The similarity metric is given by:

$$M = \sum_{i=1}^{N} W_i \frac{(X_i - \overline{X}_i)^2}{\delta_i^2}$$

where
M=Mahalanobis distance,
$W_i$=weighting coefficient on ith tracking feature,
$X_i$=value of the ith tracking feature for a current cycle,
$\overline{X}_i$=mean of ith tracking feature,
$\delta_i^2$=variance of the ith tracking feature, and
N=the total number of features.

If the similarity metric is less than the predetermined maximum value FBMaxM ("YES" path out decision step 220), then the feature-based tracker updates it feature statistics and sets the new feature-based track position as its track position (step 225). Next it is determined whether the correlation tracker is in a coast mode (step 230). If the correlation tracker is not in coast mode ("NO" path out decision step 230), then the feature-based tracker acquires the next image frame and continues to run (step 215). If, however, the correlation tracker is in coast mode ("YES" path out decision step 230), then the feature-based tracker sends its output location to the guidance control unit (step 235). The feature-based tracker then acquires the next image frame and continues to run using the next image frame (step 215).

If the minimum similarity metric is less than the maximum similarity value FBMaxM ("NO" path out decision step 220), then the feature-based tracker is in coast mode and it is determined whether the correlation tracker is in coast mode (step 240). If the correlation tracker is not in coast mode ("NO" path out decision step 240), then the feature-based tracker acquires the next image frame and continues to run (step 215). If, however, the correlation tracker is in coast mode ("YES" path out of decision step 240), then the system defaults to coast mode (step 245). While the system is in coast mode the guidance control unit adjusts the gimbal at the previous slew rate (step 250). Moreover, it is determined whether a predetermined number of image frames (CoastFrames) have been processed while the system is in coast mode (step 255). If the system has not been in coast mode for a predetermined number of frames ("NO" path out decision step 255), then the feature-based tracker acquires the next image frame and continues to run (step 215). If a predetermined number of image frames have been processed while the system is in coast mode ("YES" path out decision step 255), then the automatic target recognition system is initiated and lock-on-after-launch moding is performed (step 260).

Figure 5:
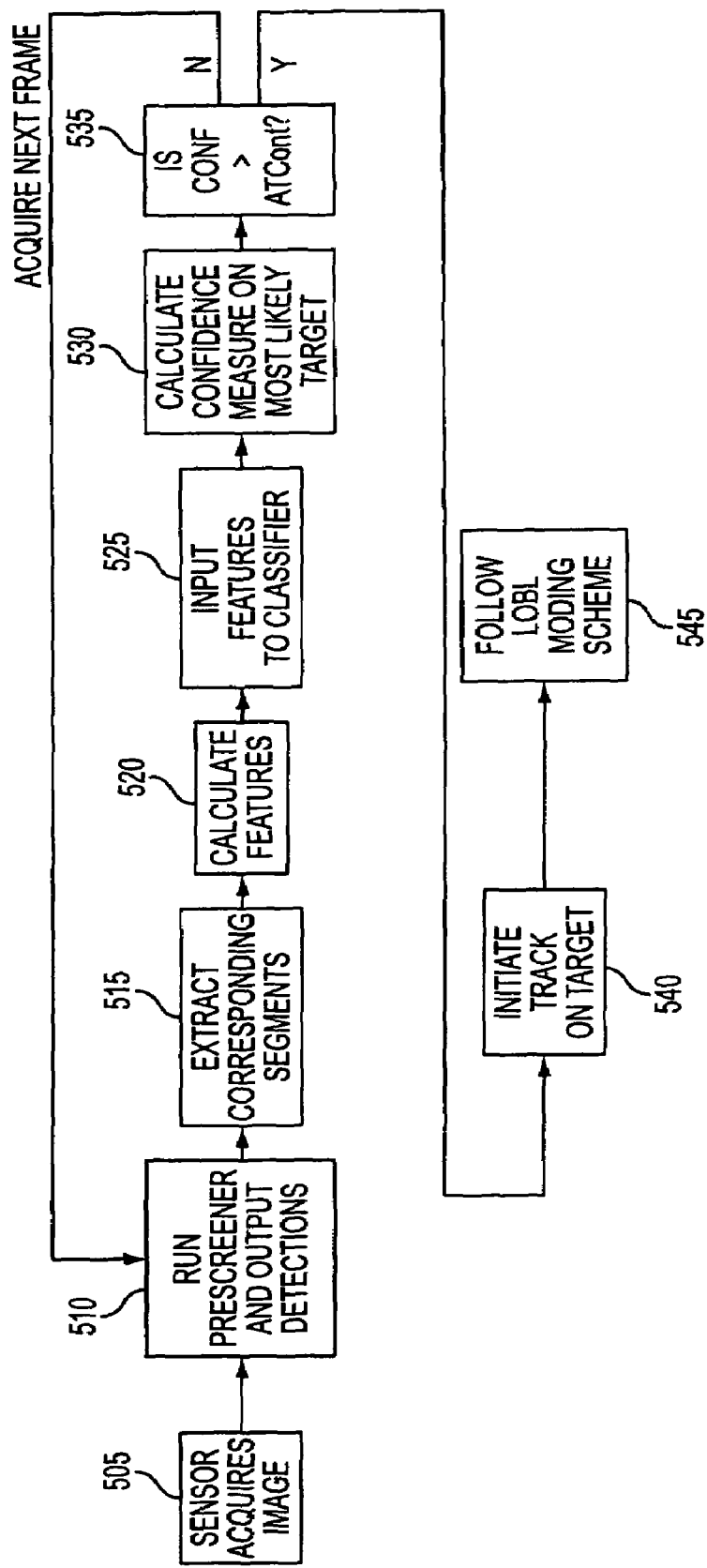
FIG. 5 illustrates the operation of the feature tracker in a lock-on-after launch scenario in accordance with exemplary embodiments of the present invention.

FIG. 5 illustrates the processing performed in a lock-on-after-launch scenario, e.g., either if the operator does not predesignate a target or when the feature-based tracker is in coast mode for a predetermined number of frames (step 260). In a lock-on-after-launch mode an autocuer provides coordinates to a master processor (described below in connection with FIG. 6). The autocuer obtains the target coordinates using a previously trained Automatic Target Recognition (ATR) function in accordance with conventional techniques. Initially, a sensor acquires an image frame (step 505). The prescreener is run and the prescreener outputs it detections to the feature-based tracker (step 510). The feature-based tracker extracts segments corresponding to the detections (step 515) and calculates the features in the segments (step 520). Next the calculated features are input to a classifier (step 525) and a confidence measure on the most likely target is calculated (step 530). If it is determined that the confidence value is less than a predetermined confidence value ATConf ("NO" path out decision step 535), then the feature-based tracker acquires the next image frame and processes it (steps 510 through 535). If, however, the confidence is greater than the predetermined confidence measure ("YES" path out decision step 535), then the feature-based tracker initiates a track on the target (step 540), and the feature-based tracker performs the lock-on-before-launch processing discussed above in connection with FIG. 2 (step 545).

While the feature-based tracker runs the correlation tracker runs in parallel (step 265). While the correlation tracker is running it is determined whether a correlation coefficient (CorrCoeff) is greater than a predetermined threshold (CTCoastThresh) for placing the correlation tracker into a coast mode (step 270). A history of correlation coefficients from N image frames can be used for determining a confidence value of the tracking of the correlation tracker, wherein N is a predetermined parameter. For example, the confidence value can be set to 90% of the previous N frame history of correlation coefficients.

Figure 7:
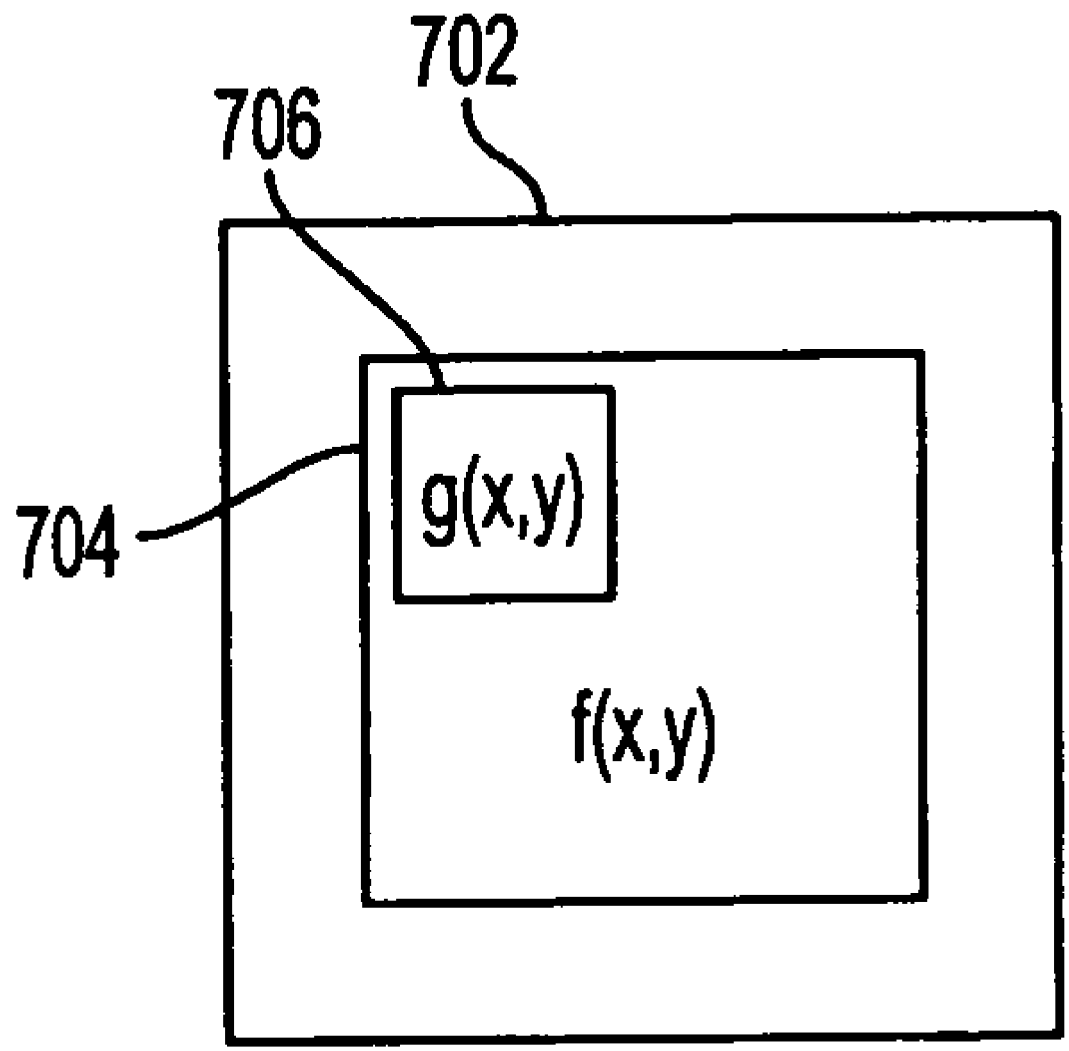
FIG. 7 illustrates a window structure used in an exemplary embodiment of the invention.

The correlation coefficient can have a value ranging from zero to one and provides a measure of the validity of the track. The correlation coefficient can be based on a Minimum Mean Squared Error (MMSE) between a reference window and a larger search window. The first reference window is obtained by extracting a region of the image that is centered on the target and is just large enough to encompass the entire target. The sizes of the search window and the reference window will vary from frame to frame depending on the range to the target. The search window can be a rectangular region surrounding the target that is at least twice as large as the reference window, or can be any other size specified by the user. FIG. 7 illustrates a window structure used in accordance with exemplary embodiments of the present invention. In an exemplary embodiment of the invention, the correlation tracker hardware will support window sizes of up to 128 pixels×128 pixels for the search window 704 and 64 pixels×64 pixels for the reference window 706, at a 60 Hz frame rate. In other words, the correlation tracker can complete calculations for a frame before the next frame is received, where the frames are received at a rate of 60 frames per second. Other window sizes and frame rates can alternatively be used, depending on particular applications or performance requirements of the tracking system.

Since the target is constantly changing contrast due to aspect and depression angle changes, the reference window being used at each frame is actually a lag filtered version of the previous reference window and the current window. Assume that $g_{history}$ refers to the reference window being used in the ith frame correlation calculation, the equation for determining it is given by:

$$g_{history}(i) = x \cdot g_{current}(i) + (1-x) \cdot g_{history}(i-1)$$

where
$g_{history}(i)$=the weighted reference window at frame i;
$g_{current}(i)$=a reference window size region centered on the target extracted from the current frame i,
$g_{history}(i-1)$=the reference window used for correlation in the previous frame i−1, and
x=the reference window update rate (<1).

If the correlation coefficient corresponding to a given MMSE drops below a given threshold, T1, for M1 out of N1 times, the value of x is increased to account for a target signature change, possibly due to a turning of the target with respect to the IR image pickup used to acquire the IR image. This incorporates the new target signature information into the reference window. It is not increased too quickly in case the target is temporarily occluded by a slight obscuration. The threshold T1 and the values M1 and N1 can be pre-loaded or predetermined parameters, which can be heuristically or experimentally determined during actual or simulated testing of the tracking system. The MMSE surface can be defined as follows:

$$MMSE(\hat{x}, \hat{y}) = \min\left(\left(\sum_{x,y} \left|\tilde{f}_{current}(x,y) - g_{history}(x+\hat{x}, y+\hat{y})\right|^2\right) / N^2\right) =$$

$$\min\left(\left(\sum_{x,y} (\tilde{f}^2_{current}(x,y) - 2\tilde{f}_{current}(x,y)g_{history}(x+\hat{x}, y+\hat{y}) + g^2_{history}(x+\hat{x}, y+\hat{y}))\right) / N^2\right)$$

where $\tilde{f}_{current}(x,y)$=the current search window gated by a mask of ones the size of $g_{history}$ and $g_{history}(x,y)$=the reference window used in the correlation, and N=a total number of pixels in the reference window.

The first term in the above equation is referred to as the "correction term" and is essentially a normalization term. The middle term is referred to as the "correlation term", and the last term is a constant.

Since correlation in the spatial domain is essentially equivalent to multiplication in the frequency domain, it can be processed in the frequency domain using fast Fourier transforms (FFTs). A mean square error (MSE) can be computed in the frequency domain as:

$$MSE(w_1,w_2) = F^2(w_1,w_2)M^*(w_1,w_2) - 2F(w_1,w_2)G^*(w_1,w_2) + G^2(w_1,w_2)$$

The correlation coefficient can be defined as follows:

$$\rho_{\tilde{f},g_{history}} = E\left[\frac{\tilde{f} - \tilde{f}_{mean}}{\sigma_{\tilde{f}}} \cdot \frac{g_{history} - \tilde{g}_{history}}{\sigma_{g_{history}}}\right]$$

where

E=is an expected value, $\tilde{f}$=the current search window gated by a mask of ones the size of $g_{history}$, $\tilde{f}_{mean}$=a mean value of the current search window, $g_{history}$=the reference window used in the correlation, $\tilde{g}_{history}$=a mean value of the reference window, $\sigma_{\tilde{f}}$=a standard deviation of the current search window, and $\sigma_{g_{history}}$=standard deviation of the reference window.

If the correlation coefficient is greater than the predetermined correlation tracker coast mode threshold ("YES" path out decision step 270), then the correlation tracker sends its output location to the guidance control unit (step 275) and the correlation tracker acquires the next image frame and processes it (step 265).

If, however, the correlation coefficient is less than the predetermined threshold ("NO" path out of decision step 270), then it is determined whether the target range is less than a predetermined minimum range, for example 500 meters (step 280). Since the image changes rapidly when the missile is within a close range of the target, the correlation coefficient of the correlation tracker will likely drop below the confidence value. However, at these distances the correlation tracker will produce the most accurate track, and hence, the track of the correlation tracker is used to guide the missile. The range to the target is periodically or continuously updated using, for example, estimates based on the velocity and flight time of the missile, outputs from on-board inertial or GPS (global positioning system) navigation systems, and/or actual range measurements such as those obtained from, for example, a laser range finder onboard the missile. If the target range is less than the predetermined minimum range ("YES" path out decision step 280), then the correlation tracker is in a deferred coast mode, its output location is sent to the guidance control unit (step 275), and the correlation tracker acquires and processes the next image frame (step 265). If, however, the target range is greater than the minimum range ("NO" path out decision step 280), then the correlation tracker is set to coast mode and the tracking system defaults to the feature-based tracker (step 285).

Figure 6:
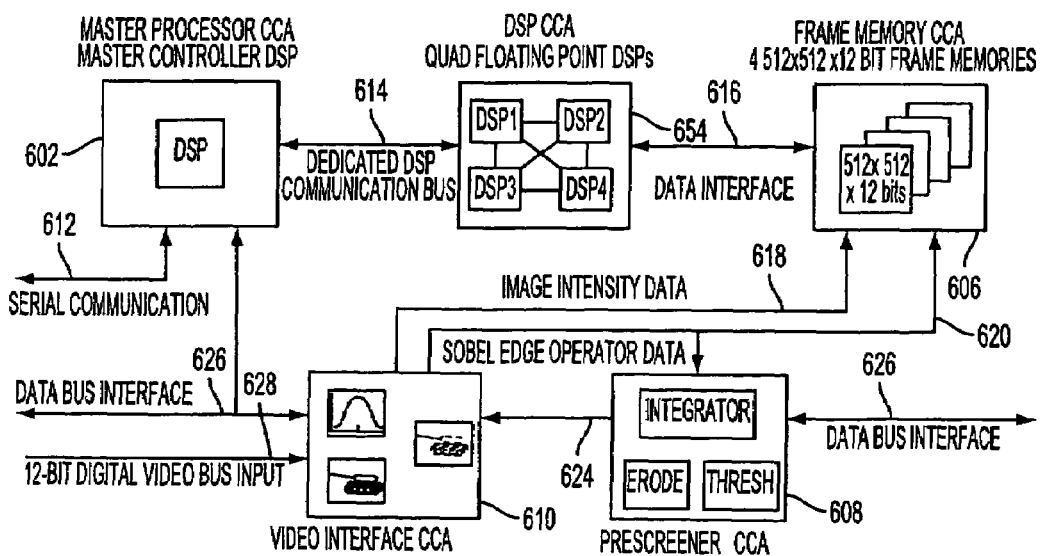
FIG. 6 illustrates a hardware block diagram of an exemplary implementation of the system of FIG. 1.

FIG. 6 illustrates a hardware block diagram of an exemplary implementation of the system of FIG. 1. As illustrated in FIG. 6, the system includes a master processor 602 connected by a dedicated digital signal processor (DSP) communications bus 614 to a set 604 of quad floating point DSPs. Of course, any number of DSPs can be used provided adequate processing power to implement the functionality described herein is available. In accordance with an exemplary embodiment of the invention, under the direction of the master processor 602, the set 604 of DSPs run software that performs the correlation-based tracking functions and the feature-based tracking functions in, for example, a transparent multi-tasking or time-sharing fashion.

As those skilled in the art will recognize, the software routines for the correlation-based and feature-based tracking functions can be appropriately compiled for execution on a variety of different hardware platforms. Thus, the particular hardware or hardware platform used to perform the functions can be transparent to the overall tracking system.

The master processor 602 is also connected to a serial communication bus 612 and to a video interface 610 and a prescreener 608 via a data bus interface 626. The video interface 610 receives image data via a video bus 628, and provides image intensity data and Sobel edge operator data ascertained from the image data to a set 606 of frame memories via the lines 618 and 620, respectively. The Sobel edge operator data is also provided to the prescreener 608 via the line 620. Alternatively, any appropriate edge operator can be used instead of the Sobel edge operator, to generate edge data for use in the prescreener.

As indicated, the prescreener 608 performs integration, erode and threshold functions which are described further below. The prescreener 608 provides data to the video interface 610 via a line 624. In addition, the set 604 of DSPs is connected to the frame memory set 606 by a data interface 616.

In an exemplary embodiment, the correlation tracker 116 is implemented in software that is executed by the set 604 of DSPs, and uses edge and intensity information stored in the frame memory 606 to perform target identification and tracking. The frame memory set 606 can contain intensity and edge data for any number of image frames, each frame representing an IR image captured at a specific point in time. Each one of the DSPs in the set 604 can access the frame memories in the set 606. In accordance with an exemplary embodiment of the invention, the frame memories in the set 606 are updated at a frame rate of 60 Hz. The frame rate can, of course, be appropriately varied to any desired frame rate depending on the particular configuration and application of the tracking system.

The secondary tracker 118 can likewise be implemented in software that is executed by one or more of the DSPs in the set 604, and uses the image data stored in the frame memory set 606 to compute and analyze desired image features at a rate lower than that of the primary tracker 116. When tracking control is transferred from the primary tracker 116, the secondary tracker 118, which in this exemplary embodiment is a feature-based tracker, extracts segments of the IR images stored in the frame memory set 606, and analyzes the segments to calculate or extract various features associated with the segments. As referenced herein, a segment is an area of predetermined size within an image, that is expected to include at least a portion of a target.

Each segment can, for example, be associated with a centroid of a possible target identified by the prescreener 608. For example, each segment can include a centroid within its boundaries. In an exemplary embodiment of the invention, each segment includes a centroid within its boundaries.

In an exemplary embodiment, image feature statistics collected by the secondary tracker are stored in a local memory of the single DSP used to implement the secondary tracker 118.

FIG. 7 illustrates rectangular reference window 706 and another larger rectangular search window 704 covering a region of pixels within an image 702. That is, when the tracking system is given the predesignated target, it is given a reference window containing an actual image of the target.

Figure 8:
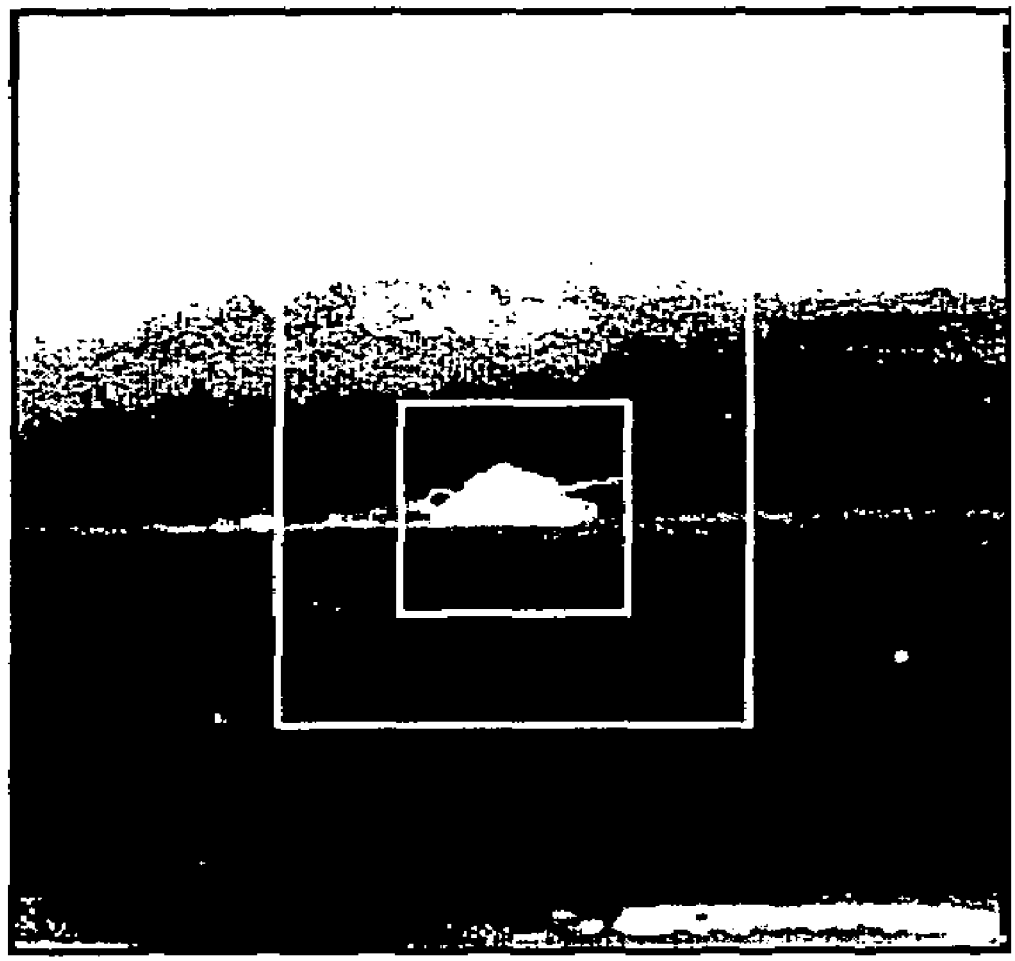
FIG. 8 illustrates the windows of FIG. 7 with respect to an example IR image including a battle tank.

For example, a helicopter pilot in a helicopter carrying the missile can look at an IR image, and designate a target within it by placing a target box around the target or by centering or otherwise designating the target using a cross hair or other aiming mechanism. The subimage within the target box, or the image area surrounding the cross hair, can be designated as the reference window image for the tracking system. As time passes, the missile and the target can move with respect to each other, which can cause the target to move to a different location in the image 702. To detect this movement and correct for it, the tracking system moves the reference window 706 over the search window 704 to determine which portion of the search window 704 most closely matches the subimage in the reference window 706, and thereby determine the new location of the target in the search window 704. The portion of the search window 704 that most closely matches the subimage in the reference window 706 then becomes the new subimage for the reference window 704. In this way the primary tracker can continue to recognize and track the target, such as a battle tank as shown in FIG. 8, even as the tank turns and presents a different outline and/or other features in the image. The secondary tracker can likewise continue to recognize and track the target because the secondary tracker also compares information in the reference window with information in the search window to track the target, albeit in a different way than the primary tracker.

Thus, each of the primary and secondary trackers in the tracking system can recognize the target despite changes in the target image between comparisons. The rate of the comparison and the rate of renewal (that is, the frequency or speed with which the subimage in the reference window 706 is matched to a portion of the search window 704, and the rate at which the reference window subimage is replaced by the matching image portion in the search window), can be appropriately selected so that the change in appearance of the target between comparisons will generally be small enough that the tracking system will continue to properly identify the target. These rates can be based on such factors as expected missile velocity, shape of the target, movement capability of the target, etc. For example, a target that moves quickly and can present very different outlines depending on orientation, and which can thus quickly change outline, may require a higher comparison rate. In addition, the rate of renewal can be varied during operation of the tracking system, for example during missile flight towards a target. This generally applies to each of the correlation-based and image-based trackers in the tracking system. This avoids situations where the tracking system loses the target and erroneously tracks a non-target object that is more similar to the reference window subimage than the new aspect or outline of the target.

The reference window 706 can be just large enough to encompass the target's image in the IR image 702. However, the size of the target's image in the IR image 702 will change as the distance between the missile (and an IR image pickup onboard the missile that provides the IR image 702) and the target changes. For example, the target's image will become larger as the missile gets closer to the target. In accordance with an exemplary embodiment of the invention, the size of the reference window 706 is adjusted so that the target's image does not outgrow the reference window. This adjustment function can be performed by the secondary tracker, or can be performed based on information provided by the secondary tracker. For example, the target height and target width features calculated by the secondary tracker can be used to resize the reference window 706 to properly encompass the target's image in the IR image 702, as a distance from the target changes.

If the target's image moves toward a boundary of the search window 704, the location of the search window 704 can be relocated within the image 702 to position the target's image at or near the center of the search window 704.

Those skilled in the art will recognize that although rectangular windows are illustrated in FIG. 7, the reference window and the search window can alternatively have shapes other than rectangles.

In an exemplary embodiment of the invention, the feature-based tracker can complete calculations for a given frame or IR image in about 4 frames. In other words, where new IR images are received at a rate of 60 IR images or frames per second, the feature-based tracker can complete calculations for a given frame in about 4/60 of a second. As the missile moves closer to the target and a size of the target image in the IR image increases, more calculations are typically necessary and the feature-based tracker may require additional time to complete calculations for a given frame. The user can specify any appropriate calculation speed for the feature-based tracker based on, for example, an expected rate at which new IR images or frames are received by the tracking system, the type of target expected, and so forth.

The prescreener is a target detector. Its purpose is to indicate possible targets by providing a list of centroids for all possible targets in each image frame. Range to the center of the IR image prior to missile launch is assumed to be known. From this, it is possible to calculate ranges to every location in the image and the appropriate number of pixels corresponding to a target at any location in the image. In accordance with exemplary embodiments of the invention, the information provided by the prescreener can be used to corroborate or provide a confidence measure for targets identified by the primary tracker, such as a correlation-based tracker, and can indicate where the secondary tracker, such as a feature-based tracker, and also the automatic target recognition (ATR) function described further below, should look to discern target features.

In an exemplary embodiment of the prescreener, hardware field programmable gate arrays (FPGAs) are used to create Sobel image edge magnitude and direction values from the input video stream in real time. Sobel concepts are described in *Digital Image Processing Second Edition*, R. Gonzalez and P. Wintz, Addison-Wesley, Massachusetts, 1987, and *Digital Image Processing Second Edition*, W. Pratt, John Wiley & Sons Inc., New York, 1991, which are hereby incorporated by reference. The FPGAs in the prescreener can be programmed to apply any user defined 3×3 operator. Reprogrammable hardware is available to calculate real time histogram data about various images within the prescreener process. The histogram data is placed in FIFO memories that are read by the master DSP processor to compute image threshold levels.

The prescreener first calculates strong edges in the image by applying the known Sobel edge operator to provide edge magnitudes and edge directions. Once the edge magnitudes are calculated, they are thresholded and binarized. The threshold value is determined from the Sobel magnitude histogram. The histogram can be a plot of pixel intensity values along the x-axis and a number of pixels along the y-axis, so that for a given intensity on the x-axis the histogram plot will indicate how many pixels in the image (after being operated on by the Sobel edge operator) have that intensity. The threshold value is chosen by starting at the right end of the x-axis at the highest intensity, and moving leftward along the x-axis toward the origin until the slope of the histogram is, for example, −1 or −3. The intensity value at that point on the histogram can be used as the threshold value. Other values can be selected for the slope, based for example on such factors as environmental conditions the tracking system is expected to be used in, performance requirements, types of targets expected, and the like. The image is binarized by replacing the value of each pixel that is above the threshold with a one, and replacing the value of each pixel that is below the threshold with a zero.

After the image has been operated on by the Sobel edge operator and then thresholded and binarized, it is integrated with boxes of different sizes that correspond to possible targets. The image is integrated with a given box, for example, by centering the box on each pixel in the image that will allow the box to be completely on the image (without the box hanging off one or more edges of the image), and then generating a value for the pixel centered in the box that is the sum of all the pixel values within the box divided by the number of pixels in the box. The box sizes can be appropriately chosen or scaled depending on the particular application of the invention. For example, in an exemplary embodiment of the invention the box sizes range from a minimum of 3 pixels×3 pixels to a maximum of 64 pixels×64 pixels.

A second histogram is then constructed, using the new pixel values generated during the integration, and a second threshold value is determined using the second histogram in the same fashion that the first histogram was used to determine the first threshold. The desired slope used to locate the second threshold can be −1, −3, or any other appropriate value, and can be chosen based on factors such as performance requirements, types of targets expected, environmental conditions, and the like. The integrated image is then thresholded using the second threshold. In other words, each pixel in the integrated image is compared with the second threshold. Once the integrated image has been thresholded, it is binarized. The pixels in the integrated and thresholded image which have non-zero values indicate the location and general shape of possible targets in the IR image.

Next, centroids for each possible target are calculated by applying a morphological erode operator to peel away outer layers of each possible target image in the integrated image until, for example, only one pixel is left for each possible target. The remaining pixel forms the centroid for that possible target. The number of erodes necessary to create each centroid of a possible target indicates a relative size of the corresponding object or possible target. If the object it is too large or too small to be the target, then the object is considered to be invalid and that centroid value is discarded. In addition, the box shapes or proportions can also provide information that can help the prescreener identify potential targets. For example, different box shapes can correspond to general shapes of types of targets likely to be encountered, so that the average pixel value within a box together with the general shape or proportion of the box can provide an indication that the box encompasses a potential target.

After centroids of invalid objects are discarded, the remaining centroids comprise the detection list for the current image frame. For example, the number of erodes necessary to create each centroid can be stored and compared to a number of erodes that would have been necessary to erode the predesignated target provided to the tracking system, at a location in the IR image of the corresponding possible target. Images corresponding to prescreener function steps described above are shown in FIGS. 9–12.

Figure 9:
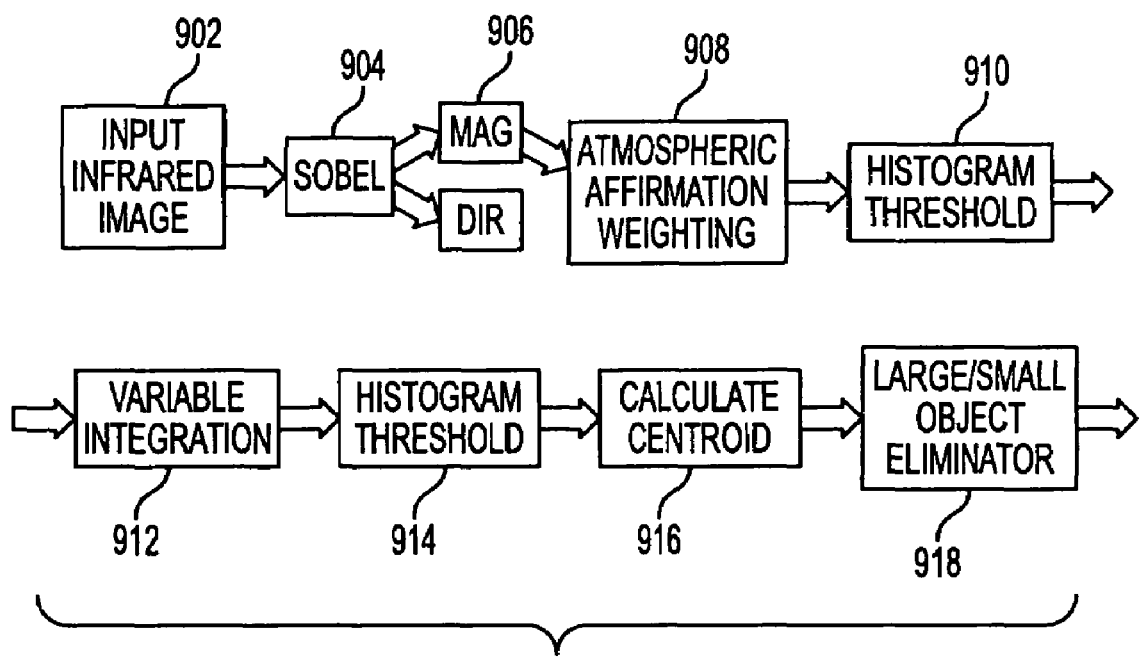
FIG. 9 illustrates a functional diagram of a prescreener in accordance with an exemplary embodiment of the invention.

In particular, FIG. 9 outlines a sequence of the steps that summarizes the prescreener functions described above. In step 902, an IR image is input to the prescreener. In step 904, the Sobel edge operator is applied to the IR image, to provide edge magnitude and direction information as indicated in step 906. In step 908, the edge magnitude information is evaluated using atmospheric attenuation weighting to compensate for known atmospheric effects, and then in step 910 the resulting information is thresholded. Next in step 912, the resulting thresholded information is integrated over the IR image using variable box sizes, as described above, and the resulting values are thresholded again in step 914. In step 916 the thresholded values from step 914 are used to calculate centroids of possible targets in the IR image. In step 918, invalid targets (and corresponding centroids) are identified and discarded using information about the size of each potential target, ascertained during the centroid calculations.

Figure 10:
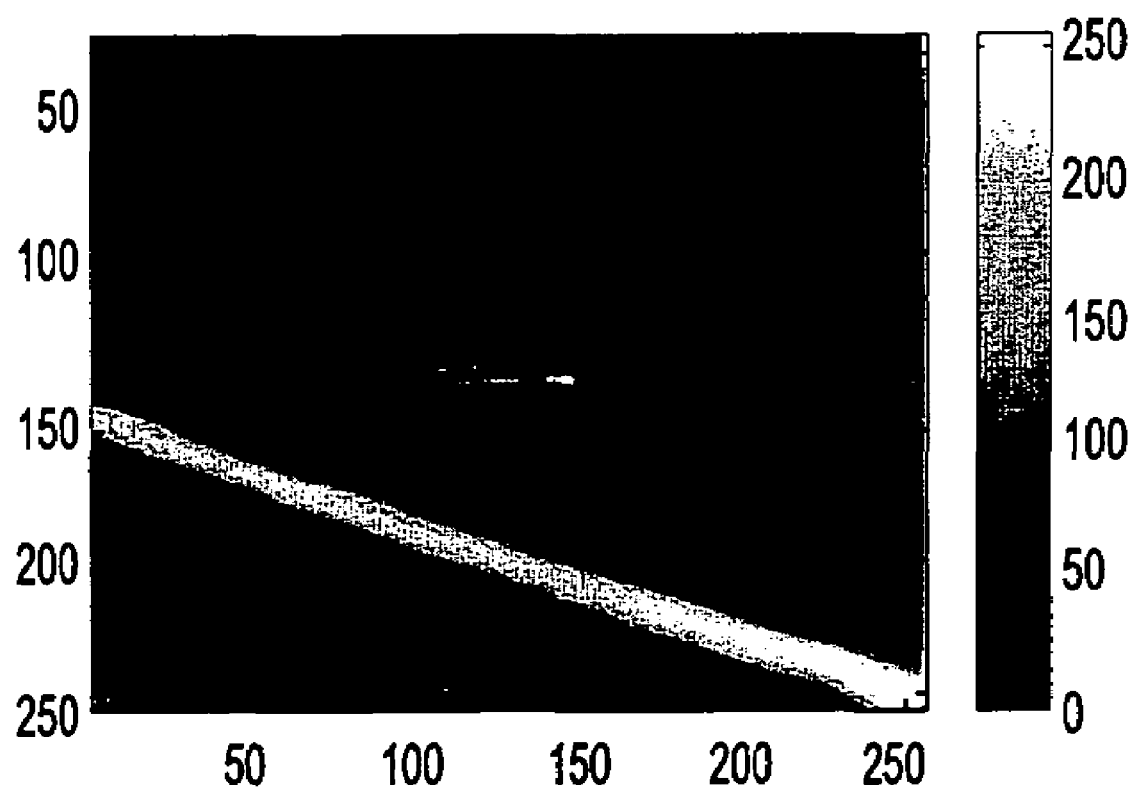
FIG. 10 illustrates an example IR image provided to the prescreener.

FIG. 10 illustrates an exemplary IR image frame that is input to each of the prescreener and the primary and secondary trackers. The IR image frame includes a battle tank in profile at the image center, with the turret gun extending from the left end of the tank. The bright spot at the rear of the tank on the right end of the tank image, indicates that this location (which is where tank engines are typically located) has a higher temperature than other portions of the tank. The thick bright line running diagonally through the foreground of the image represents the IR signature of a road, which appears to be warmer than the terrain surrounding it.

Figure 11:
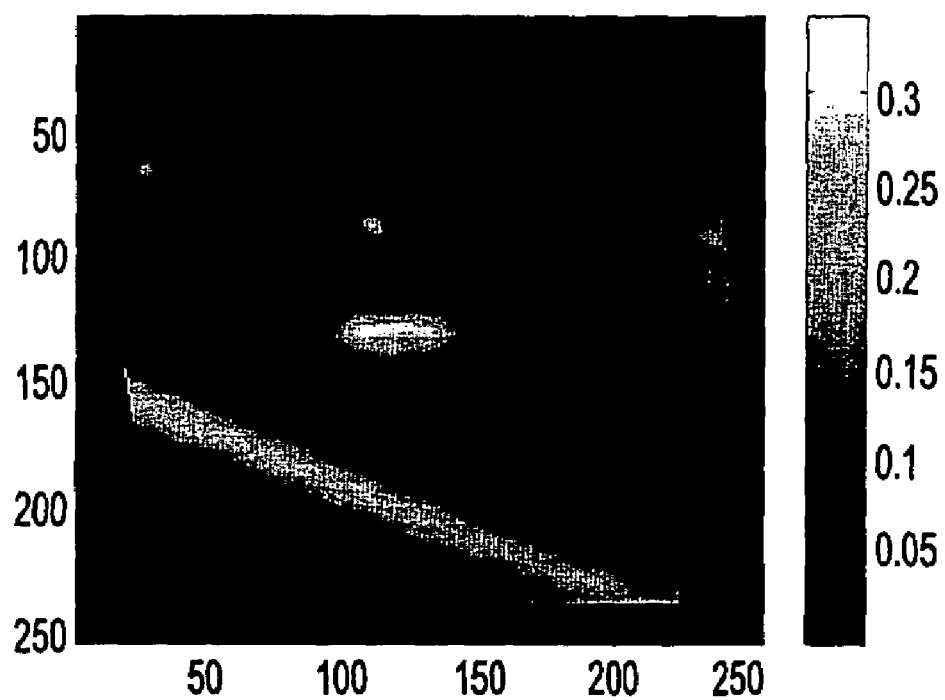
FIG. 11 illustrates an integrated IR image based on the IR image of FIG. 10.
Figure 12:
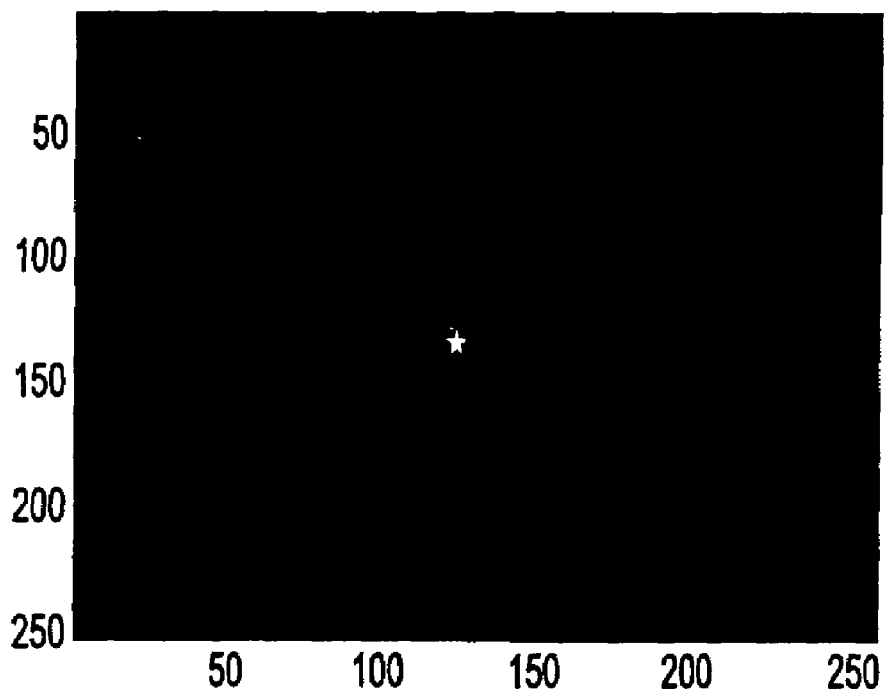
FIG. 12 illustrates a target centroid identified by the prescreener from the image of FIG. 10.

FIG. 11 illustrates the IR image of FIG. 10, after the prescreener has integrated it but before the integrated image has been thresholded and binarized. FIG. 12 illustrates a final result of the prescreener's evaluation of the FIG. 10 image, with a centroid indicating the location of the tank within the IR image and denoted with a star.

In accordance with an exemplary embodiment of the invention, each of the prescreener functions can be implemented in hardware FPGAs. The prescreener algorithm can be operated at real time frame rates and produce a target candidate list for each frame of input image data. Alternatively, in accordance with other exemplary embodiments of the invention, some or all of the prescreener functions can be implemented using software.

Figure 13:
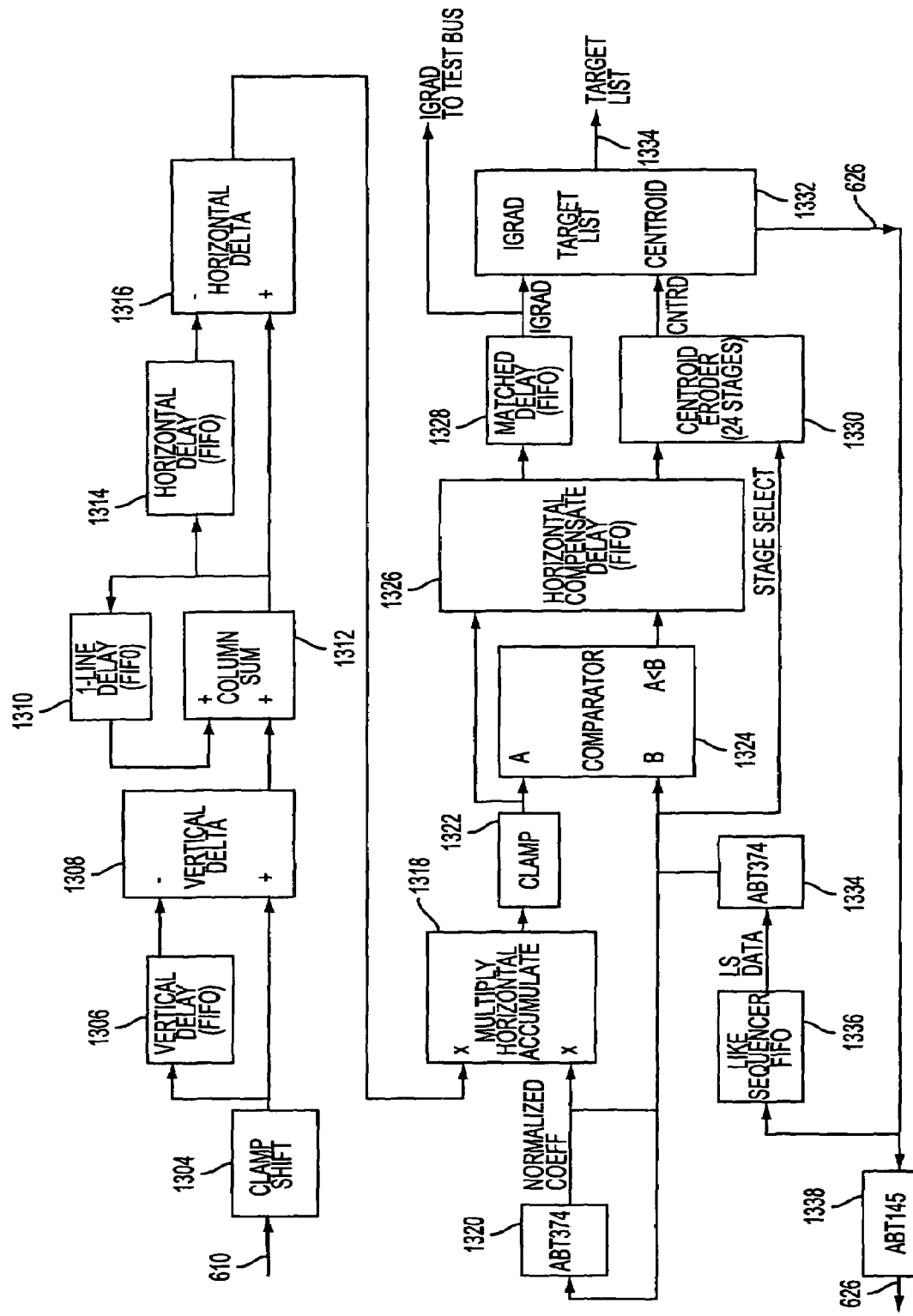
FIG. 13 illustrates a functional block diagram of a prescreener in accordance with an exemplary embodiment of the invention.

FIG. 13 illustrates a functional block diagram of the prescreener 608 shown in FIG. 6, in accordance with an embodiment of the tracking system. To prepare IR image data for delivery to the prescreener 608, the video interface 610 applies the Sobel edge operator to an IR image frame provided to the tracking system, and also assembles a histogram based on the resulting image. The video interface 610 provides the histogram to the master processor 602, which uses it to determine an appropriate threshold. The video interface 610 uses the threshold to threshold and binarize the image that has been processed by the Sobel edge operator. The resulting image is provided to the prescreener, and the prescreener appropriately integrates, thresholds and binarizes the image, and then evaluates subimages remaining in the image to determine valid centroids that correspond to possible targets. Finally, the prescreener outputs a list of valid centroids for the IR image frame.

In particular, the image data is provided by the video interface 610 to the prescreener 608 in real time to a clamp shifter function 1304 via the data bus 626. The clamp shifter function 1304 ensures that the data does not exceed predetermined values, and thereby avoids computational errors that could occur within the prescreener if excessively large values were evaluated.

The data then passes through the vertical delay first-in-first-out (FIFO) function 1306, the vertical delta function 1308, the column sum function 1312, the I-line delay function 1310, the horizontal delay function 1314, and the horizontal delta function 1316 before being provided to the multiply horizontal accumulate function 1318. The horizontal compensate delay function 1326 and the matched delay FIFO function 1328 are also provided in the data flow near the end of the prescreener. These delay and delta functions digitally pipeline the image data in accordance with principles well known in the art, to meter the flow and timing of data moving through the prescreener, and thereby properly coordinate simultaneous and sequential operations within the prescreener.

The column sum function 1312 and the multiply horizontal accumulate function 1318 perform the integration function of the prescreener described further above. In other words, the sequence of functions 1302–1320 in the prescreener together integrate the image received by the clamp shift function 1304.

The integrated image is clamped by the clamp function 1322 to ensure that the pixel values are within bounds and do not exceed predetermined values, and then provided to the comparator 1324 which thresholds and binarizes the integrated image. The resulting image is provided via the horizontal compensate delay function 1326 to a centroid erode function 1330, which erodes subimages in the image to obtain valid centroids. The locations of valid centroids in the IR image are provided to a target list FIFO function 1332, which includes them in a list to indicate possible targets in the IR image frame. When the target list FIFO function 1332 has received all valid centroids for the image, it sends a signal to the master processor 602 via the TL_INT line 1334 to indicate that a current centroid list is available and can be retrieved using the data bus 226.

The master processor 602 can send control information to the prescreener to control, for example, the integration and centroid determination processes of the prescreener. In particular, the line sequencer FIFO function 1336 receives control information from the master processor 602 via the data bus 626. The control information can include, for example, a minimum and a maximum number of erodes that are provided to the centroid eroder 1330 to determine whether a possible target in the IR image is either to large or too small and should be discarded and not indicated in the list maintained by the target list FIFO function 1332. If the number of erodes necessary for the centroid eroder 1330 to erode a subimage to a single pixel is less than the minimum number of erodes or greater than the maximum number of erodes, then the subimage is respectively either too small or too large to be a possible target, and the centroid is discarded by the centroid eroder function 1330 and not passed on to the target list FIFO function 1332 for inclusion in the list.

The master processor 602 also provides control information to the prescreener via the line sequence FIFO function 1336 to control or specify, for example, the threshold value which the comparator function 1324 should use to threshold and binarize the integrated image. The threshold value can be obtained, for example, by providing an integrated image from the multiply horizontal accumulate function 1318 to the video interface 610 via the clamping function 1322, the horizontal compensate delay function 1326 (bypassing the comparator 1324 as shown in FIG. 13), the matched delay FIFO function 1328, the target list FIFO function 1332 and the bus 626. The video interface 610 assembles a histogram using the integrated image data which it then provides to the master processor 602, and the master processor 602 evaluates the histogram to determine the threshold. A threshold value for a current, integrated image can be based in whole or in part on one or more previous integrated images. The control information also includes information regarding the window or box size that should be used to integrate the image.

Some or all of the control information can vary depending on which portion of the IR image is being evaluated. For example, in a situation where the missile is moving over the ground toward a target, the lower part of the IR image will generally represent objects or terrain that are closer to the missile than objects or terrain shown in the upper part of the IR image. In addition, a size of an image that represents a given target in the IR image will increase as a distance between the missile and the target decreases. Thus, where it is important to have the box encompass a target image for a given target type and little more, the box size used to integrate the upper part of the image will be smaller than the box size used to integrate the lower part of the image, and all box sizes will generally increase as the missile moves towards targets represented in the IR image. Those skilled in the art will recognize the various conditions, situations, performance requirements, and available techniques under which box sizes can be advantageously controlled or specified during integration.

The functional elements 1320, 1334 and 1338 shown in FIG. 13 represent digital buffers provided in accordance with well known digital design principles.

In accordance with an exemplary embodiment of the tracking system, the prescreener can be implemented using prescreeners known in the art, configured with sufficient computing and/or hardware resources to provide centroids of possible targets at an appropriate frame rate chosen by the user.

The tracking system can also include an automatic target recognition (ATR) function 122, as shown in FIG. 1, which can be used to either acquire a new target after missile launch, or to reacquire a target that has been lost by both the primary and secondary trackers, e.g., the correlation-based and feature-based trackers. The ATR receives the target detection list from the prescreener, and then extracts segments from the IR image frame that correspond to the items in the list. Features are then computed for each segment, and feature vectors are input to a discriminant function and each target is classified based on the output of the discriminant function.

The weights incorporated into the discriminant function are determined by a priori training using digital imagery. Statistical classifiers such as the Minimum Distance Linear, Gaussian, general quadratic or any other classifier can be used for the discriminants. The ATR can be run over a predetermined number of frames, and an accumulated confidence can be computed and used to identify a target. Once the tracking system has either acquired the new target or reacquired an original target, it returns tracking control to the correlation-based tracker and tracking continues normally.

The attached appendix A includes an implementation of MATLAB code which calculates features used in an exemplary ATR.

In an exemplary embodiment of the tracking system, the ATR can be used so that when the primary tracker loses the target and the missile goes into coast-mode as the secondary tracker attempts to identify and track the target, if after a predetermined period of time or number of attempts the secondary tracker is unsuccessful in its efforts to re-acquire the target, tracking control can be turned over to the ATR to either reacquire the original target or acquire new targets. Specifically, when the primary and secondary tracker lose the target, the gimbal continues to slew at the previous rate by centering the target in the image. While the gimbal continues to slew at the previous rate, the primary and secondary trackers attempt to reacquire the target. If the trackers attempt to reacquire the target for more than a predetermined number of image frames, the target track is considered lost and the ATR attempts to reacquire the target. To reacquire the target the ATR function increases the search window, and the gimbal continues to slew at the previous rate.

In accordance with an exemplary embodiment of the invention, the secondary tracker and the ATR only evaluate portions of an IR image that correspond to possible targets indicated by the prescreener. In accordance with another exemplary embodiment of the invention, the secondary tracker and ATR can evaluate portions of an IR image other than those corresponding to possible targets indicated by the prescreener, as specified by the user or in the event the prescreener becomes inoperative.

Concepts of mean square error, mean, variance, and correlation coefficient are described in *Probability, Random Variables, and Random Signal Principles* $2^{nd}$ *Edition*, Peyton Z. Peebles, Jr., McGraw-Hill Book Company, New York, 1987 and *Probability, Random Variables, and Stochastic Processes* $2^{nd}$ *Edition*, Athanasios Papoulis, McGraw-Hill Book Company, New York, 1984, which are hereby incorporated by reference.

The following articles are also hereby incorporated by reference:

*Spatiotemporal Multiscan Adaptive Matched Filtering*, Kenneth A. Melendez and James W. Modestino, Paper No. 2561-06, SPIE Proceedings Vol. 2561, Signal and Data Processing of Small Targets, pages 51–65, 1995, ISBN 0 8194 1920 6;

*Maneuvering Target Tracking by Using Image Processing Photosensor*, Sergey L. Vinogradov, Paper No. 2561-20, SPIE Proceedings Vol. 2561, Signal and Data Processing of Small Targets, pages 210–219, 1995, ISBN 0 8194 1920 6;

*Long-Range Automatic Detection of Small Targets in Sequence of Noisy Thermal Infrared Images*, Dirk Borghys and Marc B. Acheroy, Paper No. 2235-60, SPIE Proceedings Vol. 2235, Signal and Data Processing of Small Targets, pages 264–275, 1994, ISBN 0 8194 1539 1; and

*Feature-Based Tracking and Recognition for Remote Sensing*, Curtis Padgett and David Q. Zhu, Paper No. 2466-05, SPIE Proceedings Vol. 2466, Space Guidance, Control, and Tracking II, pages 41–50, 1995, ISBN 0 8194 1819 6.

It will be appreciated by those skilled in the art that the present invention can be embodied in other specific forms without departing from the spirit or essential characteristics thereof, and that the invention is not limited to the specific exemplary embodiments described herein. The presently disclosed exemplary embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A multi-stage image-based tracking system, comprising:
    a first tracker for identifying at least one target within at least one image provided to the system; and
    a second tracker for identifying the at least one target within the at least one image, wherein the second tracker is a feature-based tracker, wherein the second tracker is initialized during tracking by the first tracker;
    wherein when the first tracker fails to identify the at least one target, the second tracker provides identification of the at least one target to the first.

2. The system of claim 1, further comprising a prescreener for processing the at least one image to provide a list of possible targets, wherein the first and second trackers identify the at least one target based on the at least one image and the list.

3. The system of claim 2, wherein the list is used to corroborate target identification of the first and second trackers.

4. The system of claim 2, wherein the list is used to provide a quality measure of a target identification of at least one of the first and second trackers.

5. The system of claim 2, further comprising:
    an automatic target recognition module that receives the list of possible targets from the prescreener, identifies a target from the list of possible targets, and provides the identified target to the first and second trackers when the first and second trackers both lose tracking of an initial target.

6. The system of claim 5, wherein the identified target is the same as the initial target.

7. The system of claim 5, wherein a device guided by the tracking system continues based upon an identification of the at least one target by the first tracker or the second tracker when both the first and second trackers lose tracking of an initial target.

8. The system of claim 1, wherein the prescreener generates the list by integrating edge information in the at least one image.

9. The system of claim 1, wherein the image is an infrared image.

10. The system of claim 1, wherein the first tracker is a correlation-based tracker.

11. The system of claim 1, wherein the at least one image is provided by an image pickup on a missile.

12. The system of claim 1, wherein whether the first tracker fails to identify the at least one target is based on a confidence value associated with the at least one target identified by the first tracker.

13. The system of claim 12, wherein the confidence value is determined based upon an identification of the at least one target by the first tracker in a predetermined number of images.

14. The system of claim 1, wherein when the second tracker fails to identify the at least one target, the first tracker provides identification of the at least one target to the second tracker.

15. The multi-stage image-based tracking system of claim 1, wherein the first and second trackers are reinitialized when a confidence value associated with the tracking of the second tracker falls below a second predetermined minimum value.

16. The multi-stage image-based tracking system of claim 1, wherein the first tracker and the second tracker track a target in parallel.

17. A method for identifying targets within at least one image using a primary tracker and a secondary tracker, comprising the steps of:
tracking at least one target in the at least one image using the primary tracker;
evaluating a tracking performance of the primary tracker;
initializing the secondary tracker during tracking by the primary tracker;
switching tracking control from the primary tracker to the secondary tracker when the tracking performance of the primary tracker falls below a first predetermined minimum value;
acquiring and tracking the at least one target using the secondary tracker, the secondary tracker is a feature-based tracker, which calculates a predetermined number of features of the at least one target within the at least one image;
switching tracking control from the secondary tracker to the primary tracker after acquiring the at least one target using the secondary tracker.

18. The method of claim 17, further comprising the steps of:
generating a list indicating possible targets in the at least one image using a prescreener; and
providing the list to the primary and secondary trackers to enhance the tracking performance of the primary and secondary trackers.

19. The method of claim 18, wherein the step of generating the list comprises the steps of:
calculating strong edge information in the at least one image using an edge operator;
integrating the edge information over the at least one image using a plurality of boxes having different sizes to determine possible targets; and
applying a morphological erode operator to the integrated at least one image to calculate centroids of possible targets within the at least one image,
wherein the centroids indicate the possible targets.

20. The method of claim 19, wherein the edge operator is a Sobel edge operator.

21. The method of claim 18, wherein the step of generating comprises:
calculating strong edge information in the at least one image using an edge operator;
evaluating at least an edge magnitude portion of the strong edge information using atmospheric attenuation weighting to compensate for atmospheric effects;
thresholding the compensated strong edge information;
integrating the thresholded information over the at least one image using variable box sizes;
thresholding the integrated information; and
calculating centroids that correspond to potential target objects in the at least one image, based on the thresholded integrated information.

22. The method of claim 21, further comprising:
determining whether each potential target object is too large or too small to be a valid potential target;
based on the step of determining, discarding potential target objects that are too large or too small to be valid potential targets.

23. The method of claim 21, wherein the step of calculating centroids is performed by applying a morphological erode operator to subimages in the thresholded integrated information.

24. The method of claim 23, further comprising:
determining a size of a potential target object represented by a subimage in the thresholded integrated information, by counting a number erodes that the morphological erode operator must perform to reduce the subimage to a single pixel.

25. The method of claim 21, wherein:
the step of thresholding the integrated information generates a processed version of the at least one image; and
the step of calculating centroids comprises calculating centroids of subimages in the processed version of the at least one image, that correspond to potential target objects in the at least one image.

26. The method of claim 17, wherein the at least one image is provided by an image pickup on a missile.

27. The method of claim 17, wherein tracking control is switched from the primary tracker to the secondary tracker when a distance between the primary and secondary trackers and the at least one target is greater than a predetermined distance.

28. The method of claim 17, wherein prior to switching tracking control from the primary tracker to the secondary tracker the secondary tracker is initialized.

29. The method of claim 28, wherein the initialization of the secondary tracker comprises:
determining whether the tracking performance of the primary tracker is above the predetermined minimum;
receiving a list indicating possible targets from a prescreener;
computing features in a number of images;

calculating statistics of the computed features; and determining whether the secondary tracker identifies valid targets in a predetermined number of the number of images.

30. The method of claim 17, comprising:

reinitializing the primary and secondary trackers using an output from an automatic target recognition module when a value associated with the tracking performance of the secondary tracker falls below a second predetermined minimum value.

31. The method of claim 17, wherein the first tracker and the second tracker track a target in parallel.

32. A method for identifying targets within at least one image comprising the steps of:

tracking at least one target in the at least one image using a primary tracker;

tracking the at least one target using a secondary tracker;

evaluating a tracking performance of the primary tracker;

switching tracking control from the primary tracker to the secondary tracker when a confidence value associated with the tracking of the primary tracker falls below a first predetermined minimum value; and reinitializing the primary and secondary trackers using an output from an automatic target recognition module when a confidence value associated with the tracking of the secondary tracker falls below a second predetermined minimum value and the confidence value associated with the primary tracker remains below the first predetermined minimum value.

33. The method of claim 32, wherein the at least one image is provided by an image pickup on a missile.

34. The method of claim 32, wherein the primary tracker is a correlation-based tracker and the secondary tracker is a feature-based tracker.

35. The method of claim 32, wherein reinitialization of the primary and secondary trackers comprises:

receiving, by the automatic target recognition module, a list of possible targets from a prescreener;

identifying, by the automatic target recognition module, a target from the list of possible targets; and providing the identified target to the primary and secondary trackers when the first and second trackers both lose tracking of an initial target.

36. A method for identifying and tracking at least one target within at least one image using a primary tracker and a secondary tracker and an automatic target recognition module, comprising the steps of:

tracking at least one target in the at least one image using the primary tracker;

tracking the at least one target using the secondary tracker;

evaluating a tracking performance of the primary tracker;

evaluating a tracking performance of the secondary tracker;

switching tracking control from the primary tracker to the secondary tracker when the tracking performance of the primary tracker falls below a first predetermined minimum and the tracking performance of the secondary tracker remains above a second predetermined minimum;

switching tracking control to the primary tracker when the tracking performance of the primary tracker rises above the predetermined minimum;

switching tracking control to the automatic target recognition module when the tracking performance of the primary tracker is below the first predetermined minimum and the tracking performance of the secondary tracker is below the second predetermined minimum;

selecting a target in the at least one image, wherein the automatic target recognition module performs the selection; and identifying the selected target to the primary tracker and to the secondary tracker.

37. The method of claim 36, wherein a prescreener is also used, further comprising the steps of:

providing a list of potential target objects in the at least one image, to each of the primary tracker, the secondary tracker, and the automatic target recognition module;

wherein the target selected in the step of selecting is selected from the list of potential targets.

38. The method of claim 36, wherein the tracking performance of the primary and secondary trackers is evaluated based on tracking in a number of images.

* * * * *